United States Patent
Arian et al.

(10) Patent No.: US 6,834,743 B2
(45) Date of Patent: Dec. 28, 2004

(54) WIDEBAND ISOLATOR FOR ACOUSTIC TOOLS

(75) Inventors: Abbas Arian, Houston, TX (US); Randall Jones, Sugar Land, TX (US)

(73) Assignee: Haliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/007,955

(22) Filed: Dec. 7, 2001

(65) Prior Publication Data

US 2003/0106739 A1 Jun. 12, 2003

(51) Int. Cl.$^7$ ................................................. G01V 1/40
(52) U.S. Cl. .................. 181/102; 181/104; 181/105; 181/106; 181/108; 181/122
(58) Field of Search .................. 181/102, 104–106, 181/108, 110, 122

(56) References Cited

U.S. PATENT DOCUMENTS

| | | | |
|---|---|---|---|
| 3,190,388 A | 6/1965 | Moser et al. | 181/5 |
| 3,364,463 A | 1/1968 | Perdue | 340/17 |
| 3,770,232 A | * 11/1973 | Blake | 267/140.4 |
| 4,062,422 A | * 12/1977 | Phelps et al. | 181/198 |
| 4,066,995 A | 1/1978 | Matthews | 340/18 |
| 4,872,526 A | * 10/1989 | Wignall et al. | 181/102 |
| 5,036,945 A | 8/1991 | Hoyle et al. | 181/104 |
| 5,229,553 A | 7/1993 | Lester et al. | 181/102 |
| 5,343,001 A | 8/1994 | Cowles et al. | 181/102 |
| 5,510,582 A | 4/1996 | Birchak et al. | 181/102 |
| 5,635,685 A | 6/1997 | Tierce et al. | 181/106 |
| 5,728,978 A | 3/1998 | Roberts et al. | 181/102 |
| 6,082,484 A | 7/2000 | Molz et al. | 181/102 |
| 6,137,747 A | * 10/2000 | Shah et al. | 367/81 |
| 6,145,615 A | * 11/2000 | Beresford et al. | 181/102 |

FOREIGN PATENT DOCUMENTS

| | | | |
|---|---|---|---|
| GB | 2 288 020 | 4/1995 | G01V/1/52 |
| GB | 2 311 427 | 9/1997 | E21B/17/07 |

OTHER PUBLICATIONS

British Search Report for Application No. GB 0227806.7 dated Apr. 4, 2003: (3 p.).

* cited by examiner

*Primary Examiner*—Shih-Yung Hsieh
(74) *Attorney, Agent, or Firm*—Conley Rose, P.C.

(57) ABSTRACT

The acoustic isolator assembly of the present invention comprises a elongated cylindrical body suited for connection to an acoustic array and subsequent disposition within a wellbore. According to one embodiment of the present invention, the acoustic isolator comprises a plurality of cylindrical isolator modules that are coaxially arranged to form the body of the tool. Each isolator module comprises a spring disposed within an outer housing. The separate isolator modules are attached to one another by connecting rods around which are disposed a plurality of metal spacers. The isolator module further comprises mechanical stops that limit the deflection of the spring during high axial loading. These features enable the acoustic isolator assembly to withstand the high loading that may be applied during logging operations. Therefore, the isolator modules are capable of supporting high compressive and tensile loads without suffering permanent deformation of the springs.

25 Claims, 2 Drawing Sheets

WIDEBAND ISOLATOR FOR ACOUSTIC TOOLS

CROSS-REFERENCE TO RELATED APPLICATIONS

Not applicable.

BACKGROUND OF THE INVENTION

The present invention relates generally to well logging tools used in oil and gas wells to characterize a subterranean formation using acoustic waves transmitted and received by the tool. More specifically, the present invention relates to methods and apparatus used to acoustically isolate the transmitter from the receiver while providing sufficient structural strength to withstand common handling and use, including pushing and pulling of the tool.

Acoustic logging tools that are used to characterize subterranean formations surrounding well bores are well known in the art. In general, acoustic logging tools operate by broadcasting an acoustic signal into a formation from one or more transmitters located at one position on the tool and receiving the signal with one or more receivers located at a second location on the tool. Properties of the received acoustic signal, such as travel time, frequency, amplitude, and attenuation, are then used to characterize the surrounding formation.

The transmitters generate a compressional waveform that travels through the borehole fluids and into the surrounding formation. The acoustic wavefields propagate through the formation in a variety of modes, the most important being compressional waves, or "P-waves", and transverse shear waves, or "S-waves". P-waves are characterized by particle motion in the direction of wave travel while S-waves are characterized by particle motion perpendicular to the direction of wave travel. The various modes of propagation are distinguishable by their relative velocities. The velocities of both P-waves and S-waves depend on the elastic constants and the density of the medium through which the waves travel.

Ideally, the only acoustic signals received by the tool's receivers would be those signals that are transmitted by the tool that have traveled through the formation. However, if not properly isolated, the receiver will also detect other signals, sometimes referred to as "tool noise" or "road noise". This undesired noise can interfere with the ability of the tool to render an accurate representation of the acoustic response of the formation. This noise is typically energy, more specifically vibrations, traveling within or on the surface or body of the logging tool. The noise may be a high or low frequency noise, such as that created by the transmitters or by contact of the logging tool with the wellbore. Therefore, it is desirable to isolate the receivers of a well logging tool from extraneous sources of acoustic signals, namely the transmitters and the rigid body of the tool.

U.S. Pat. No. 3,190,388, issued Jun. 22, 1965 to Moser et al., teaches a simple acoustic well logging tool with a signal attenuating structure. The logging tool comprises an outer housing made of steel and a centrally disposed bar that supports the acoustic apparatus and is connected to the outer housing at the top and bottom of the tool. To attenuate the acoustic signal, the outer housing incorporates a series of generally U-shaped, helical grooves cut into the cylindrical metal housing on both the inside and outside diameter. The grooves are of a depth greater than one-half of the wall-thickness of the housing so as to interrupt the direct travel of the signal through the housing. The grooves are arranged so that the spacing between the inner and outer grooves lengthwise of the housing is less than one quarter of the wave length of the principal frequency of the acoustic signal. The grooves may be filled with a high-density material, such as lead, to increase the weight of the housing to further inhibit acoustic transmission. An alternate method of constructing the housing using a plurality of circular openings through the wall of the outer housing is also disclosed. The acoustic transducers are mounted on the centrally mounted, hollow bar that is constructed of Teflon™, or some other material with a low velocity characteristic.

U.S. Pat. No. 5,036,945, issued Aug. 6, 1991, to Hoyle et al. discloses a sonic well tool having a first and second attenuation and delay apparatus for attenuating and delaying the signal traversing the tool body. The first attenuation and delay apparatus includes interleaved rubber and metal like washers for attenuating compressional and flexural waves propagating along the body, and further includes a bellows section having a corrugated shape and a thin traverse dimension. The second attenuation and delay apparatus includes mass loading rings surrounding the housing of the well tool, and also includes a bellows section having a corrugated shape and a thin traverse dimension.

U.S. Pat. No. 5,229,553, issued Jul. 20, 1993 to Lester et al. discloses an acoustic isolator for use with a well logging tool having transducers in a first and third tool segment, which are to be acoustically isolated from receivers in a second and fourth tool segment. The acoustic isolator consists of vertebrate links composed of spools, encased by resilient boots, which spools are arranged end-to-end in tandem configuration. A plurality of split shells interconnect the spools by externally gripping the boots covering the end portions of the respective adjacent spools.

The design of acoustic isolators for downhole applications involves two requirements that are seemingly mutually exclusive. The first of these requirements is that the tool be sufficiently flexible to attenuate acoustic waves traveling at or near the surface of the tool. The second requirement is that the tool be strong enough to survive running and retrieval operations, which may be by wireline or tubing conveyed means. During these operations it is often required to push or pull heavy loads via the tool. It is desirable that this extreme loading not have any permanent deleterious effects on the performance of the isolator. Additionally, because of the nature of well logging operations, including the environment in which it occurs, it is desired to have a tool with a simple, robust design.

Typical acoustic well logging tools that incorporate acoustic isolators are long, flexible cylinders. Occasionally, well logging tools become stuck in the well bore and have to be retrieved using force. The typical acoustic isolator can not withstand the forces normally observed during these operations and recovery of the tool often results in destruction of, or major damage to, the tool. Therefore, a need exists in the art for an improved acoustic isolator capable of high rates of signal attenuation in normal logging operations and capable of withstanding high axial forces common to fishing or recovery operations.

SUMMARY OF THE INVENTION

The acoustic isolator assembly of the present invention comprises a elongated cylindrical body suited for connection to an acoustic array and subsequent disposition within a wellbore. According to one embodiment of the present invention, the acoustic isolator is a component of a well logging tool and is linearly disposed between an acoustic transmitter and an acoustic receiver. The acoustic isolator serves to restrict the propagation of acoustic signals along the length of the logging tool, therefore reducing the amount of tool noise or road noise received by the receiver.

According to one embodiment of the present invention, the acoustic isolator comprises a plurality of cylindrical isolator modules that are coaxially arranged to form the body of the tool. Each isolator module comprises a spring disposed within an outer housing. The separate isolator modules are attached to one another by connecting rods around which are disposed a plurality of nodal masses.

The isolator module further comprises mechanical stops that limit the deflection of the spring during high axial tension, or compression, loading. These features enable the acoustic isolator assembly to withstand the high loading that may be applied during logging operations. Therefore, the isolator modules are capable of supporting high compressive and tensile loads without suffering permanent deformation of the springs.

The springs are preferably encapsulated with a material having a low velocity characteristic, such as a rubber or phenolic compound. Holes may also be drilled radially through the coils of the spring to further inhibit the transmission of acoustic signals. These holes may also be filled with rubber or a similar material, as previously discussed. The outside diameter of the outer housing may be coated with a dissimilar material, such as fiberglass or another low velocity characteristic material that can withstand the wellbore environment. This coating preferably interferes with any signal traveling along the outer surface of the tool. Further, the outside surface of the tool provides an irregular surface that also aids in the attenuation of signals along the outside surface.

The acoustic isolator assembly provides a centrally located bore for electrical connection between the receiver and transmitter. The entire assembly may be filled with oil during operation. The oil prevents corrosion and eliminates any stresses from hydrostatic pressure in the wellbore.

Therefore, the acoustic isolator of the present invention effectively attenuates the higher frequency compressional waves through a series of isolator modules containing springs and attenuates the lower frequency transverse waves through the overall acoustic response of the system that is greatly improved through flexurally-limber isolator modules and nodal masses. The arrangement of the components also allows the tool to withstand high axial loading.

BRIEF DESCRIPTION OF THE DRAWINGS

The nature, objects, and advantages of the present invention will become more apparent to those skilled in the art after consideration of the following detailed description in connection with the accompanying figures wherein.

DETAILED DESCRIPTION OF THE PREFERRED EMBODIMENTS

Figure 1:
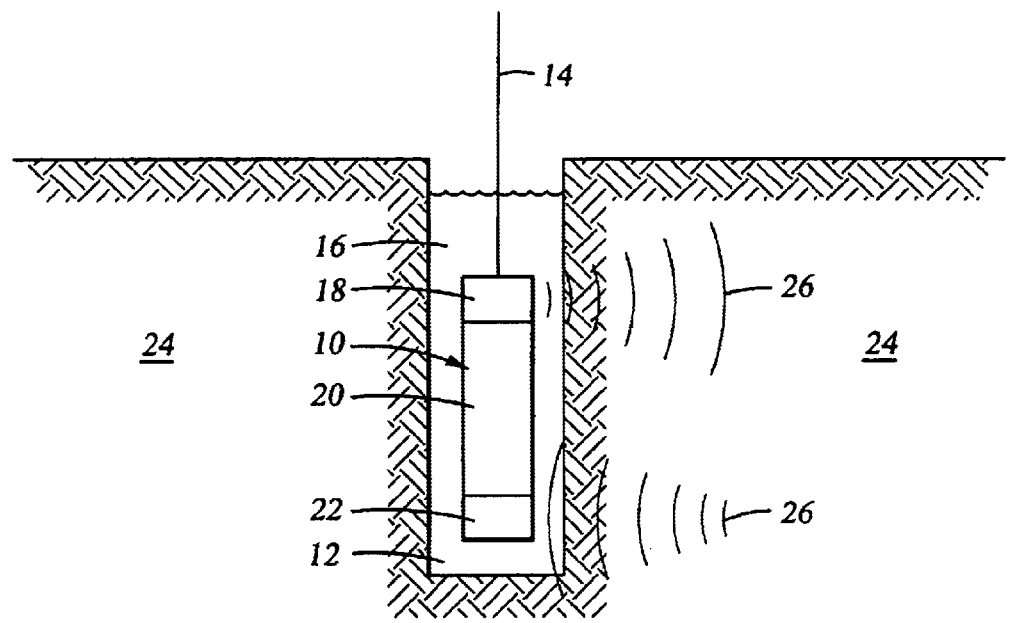
FIG. 1 is a general schematic representation of an acoustic well logging tool.

Referring to FIG. 1, an acoustic well logging tool 10 is lowered into a wellbore 12 filled with a fluid 16. The logging tool can be conveyed into the wellbore 12 by a wireline 14, or a string of pipe. The acoustic well logging tool 10 generally comprises a transmitter assembly 18, an acoustic isolator assembly 20, and a receiver assembly 22. The term "acoustic" as used in describing the present invention is intended to generally describe the nature of the tool as one that employs the use of sound waves of any frequency and is not limited to any specific frequency range, unless specifically stated or claimed.

In general operation, the transmitter assembly 18 generates an acoustic signal 26 that propagates through the wellbore fluid 16 and into the surrounding formation 24. The acoustic signal 26 propagates through the formation 24 and is received by the receiver assembly 22. The received acoustic signal can be used to determine the acoustic response of the formation 24, which can indicate the properties of the formation, such as porosity, composition, and the presence of liquids or solids in the formation.

In order to effectively analyze the acoustic signal, the receiver 22 must be very sensitive, therefore any extraneous signal that is received has the propensity to cause interference with the desired signal and degrade the performance of the tool. The acoustic isolator assembly 20 is placed between the transmitter assembly 18 and the receiver assembly 22 to decrease the acoustic energy traveling directly between the transmitter and receiver without first passing through the formation 24.

Figure 2:
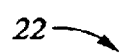
FIG. 2 is one embodiment of a well logging tool constructed in accordance with the present invention.
Figure 2:
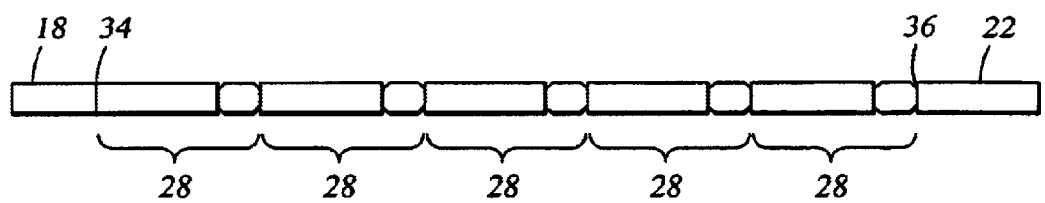

Referring to FIG. 2, the acoustic isolator assembly 22 is substantially an elongated, cylindrical assembly having a bore through the center and comprising one or more isolator modules 28 that are linearly affixed to each other. One preferred embodiment of the isolator assembly 22, comprises five isolator modules 28 connected in series between a transmitter assembly 18 at the upper end 34 and a receiver assembly 22 at the lower end 36. It is preferred that the transmitter assembly 18 and the receiver assembly 22 are affixed as close as possible to the ends 34, 36 without the inclusion of an adapter joint or other component between the transmitter and receiver components and the isolator assembly.

Although one preferred embodiment of an isolator assembly 22 constructed in accordance with the present invention uses a series of five isolator modules 28, other arrangements may also find utility depending on the amount of signal attenuation desired and the type of signal interference sought to be attenuated. It is contemplated that any number of isolator modules 28 may be used to make up a single tool. It is also possible that in the event of signal interference coming from below the acoustic receiver 22, one or more isolator modules 28 may be installed below the receiver 22.

Figure 3:
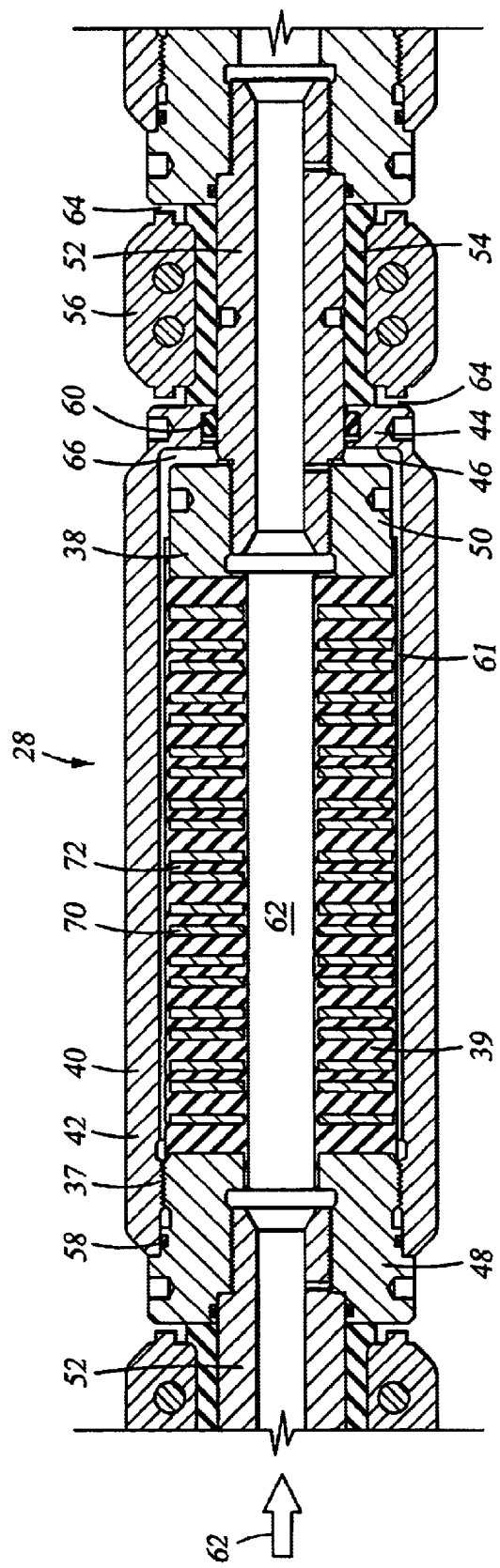
FIG. 3 is a cross-sectional view of one embodiment of an acoustic isolator module constructed in accordance with the present invention.

Now referring to FIG. 3, each isolator module 28 comprises a spring 38, an outer housing 40, a connector rod 52, an resilient spacer 54, and a metal spacer 56. Spring 38 fits inside the outer housing 40 and is threadably, or otherwise connected at the upper end 37. Resilient spacer 54 and metal spacer 56 are positioned on connector rod 52, with the resilient spacer 54 between the rod 52 and the metal spacer 56. Seal 60 is arranged so that the inner bore 62 of the module is hydraulically isolated from the outside of the tool.

Spring 38 is a linear spring having a first end 48 and a second end 50, each end being adapted for connection to a connector rod 52. Spring 38 is preferably made from a hollow, cylindrical piece of corrosion resistant alloy, such as a stainless steel or a nickel based alloy. A helical cut is made through the wall of the hollow cylinder to form a spring. This helical cut may be a single or multiple lead helix. The pitch of the helical cut is determined by the desired stiffness of the spring. One preferred embodiment is a double lead helical spring having a resultant stiffness of 10,000 to 30,000 pounds per inch. The spring 38 is coated with a resilient material 39, both on its inner and outer diameter and in between the spring coils 70. Therefore, each spring coil 70 is separated from adjacent coils by a layer of resilient material 39. The spring 38 may also have radial holes 72 that penetrate the spring coils 70, which may also be filled with a resilient material 39. The resilient material is preferably a moldable, durable material such as rubber, Viton™, or other elastomer. For effective attenuation the preferred resilient material should have a durometer (shore A scale) between 50 and 100.

Outer housing 40 is an elongated, hollow cylinder having a first end 42 adapted to be attached to the outside of spring 38 and a second end 44 having a circumferential shoulder 46. Outer housing 40 is preferably coated on its outside surface with an attenuating material, such as fiberglass. The second end 44 is adapted to receive a circumferential seal 60 on its inside diameter to seal against the connector rod 52. The outer housing 40 is preferably constructed from a corrosion resistant material, such as stainless steel or a nickel based alloy. A gap 61 of between 0.010 in. and 0.100 in. is preferably maintained between the outside surface of the spring 38 and the inside diameter of the outer housing 40.

Connecting rod 52 is a hollow, cylindrical member also preferably constructed from a corrosion resistant material such as a stainless steel or a nickel based alloy. Each end of the connector rod 52 is threaded to engage the spring 38. An resilient spacer 54 is circumferentially mounted on the outside of the connector rod 52. The resilient spacer 54 is constructed of a resilient material, such as rubber or another elastomer such as Viton™. The resilient spacer 54 forms a ring of resilient material around the outside of the connector rod 52. Metal spacer 56 is also a hollow cylinder and is installed around the resilient spacer 54. The metal spacer 56 is preferably constructed from a high density material, such as tungsten carbide or lead and serves as a nodal mass to help attenuate the acoustic signal as will be discussed below. A preferable metal spacer 56 has a density of at least one to three times the density of steel.

Each isolator module of the attenuating assembly has a centrally located bore that allows for the passage of electrical connections between the receiver and transmitter. The entire acoustic tool assembly is preferably filled with fluid during operation. The preferable fluid is a non-corrosive viscous oil, such as petroleum oil or a synthetic hydrocarbon fluid. The oil has negligible effects on the attenuation of acoustic signals through the isolator modules and it inhibits corrosion within the modules and eliminates any affect from hydrostatic pressure in the wellbore, which could over-stress the internal parts of the isolator module.

The tool described above serves to attenuate both high frequency and low frequency acoustic signals ranging from below 500 Hz to over 10,000 Hz. These signals can be attenuated through primarily two methods. The first method of attenuation is acoustic wave isolation which occurs when the signal is forced to travel across an interface of two different materials having significantly different acoustic impedances. The second method of attenuation is acoustic wave absorption that occurs when the signal is forced to travel through materials that tend to absorb the vibrations. These methods can be considered at the component level for higher frequency applications but must be analyzed macroscopically for low frequency operations where the wavelength may be as long as the tool itself. In these low frequency applications the overall flexibility of the tool has a major impact on signal attenuation. It should also be noted that the irregular outside surface of the tool also helps attenuate any signal traveling along the tool surface.

High frequency acoustic signals enter the isolator module 28 at the upper end 48 of the spring 38. The signal will then travel through the spring 38 and the outer housing 40. Sound waves traveling axially down the spring 38 will be attenuated by the multiple interfaces between the spring 38 and the resilient material 39. Sound waves traveling solely through the spring 38 will have to follow the coils of the spring 38, thereby greatly increasing the travel distance of the signal. Any signal traveling through the outer housing 40 will have to cross seal 60 to continue down the tool and therefore will have to cross two attenuating interfaces. The resultant signal then passes through the connector rod 52 and into another isolator module 28.

Low frequency acoustic signals will tend to vibrate the entire tool in waves having very long wavelengths. The combination of the flexibility of the spring 38 and the metal spacers 56 help to damp out and attenuate this signal. Because the metal spacers 56 are made of a high density material, they operate as nodal masses that absorb low frequency acoustic energy. A portion of the energy of the acoustic signal is absorbed by the motion of the spacers 56 and, as the signal travels the length of the tool, it further attenuates as it encounters additional metal spacers 56.

The inherent flexibility of the system aids in the attenuation of acoustic signals between the transmitter and receiver. This flexibility can also be a liability if the acoustic logging tool becomes stuck in a wellbore and has to be retrieved. Downhole tools that become stuck in the wellbore are often subjected to high axial loads (i.e. pushing and pulling) in an attempt to jar loose the stuck tools. In previous tools these high axial loads have often caused substantial damage or failure in the acoustic isolator components. If failure occurs, additional fishing operations are required to remove the now broken pieces of the tool from the wellbore.

The novel arrangement of components in the isolator module 28 allows each module, and consequently the tool as a whole, to withstand high axial loading. Referring to FIG. 3, when a compressive load is applied in the direction of arrow 62, spring 38 will compress. The compression of spring 38 will close compression gaps 64 until the housing 40 contacts the metal spacer 56. Once these gaps 64 are closed, the load is transferred directly from the outer housing 40 to the metal spacer 56 and into the next outer housing 40. The deflection of the spring 28 is limited so that the resilient material 39 remains molded to the spring 38 and the spring 38 does not plastically deform.

If a tension load is applied opposite arrow 62, the spring 38 will elongate. Because the outer housing 40 is threadably attached to the spring 38 at the upper end 37, the spring 38 can only elongate until tension gap 66 is closed. Once the tension gap 66 is closed the load is carried through the outer housing 40 and spring 38 is not allowed to be damaged due to excessive stretch. In both the tension and compression loading scenarios, the attenuation of the tool is severely decreased but once the load is released the tool will function properly. If the components are constructed from the preferable high-strength corrosion resistant materials the tool can withstand tension and compression loads of up to 100,000 lbs.

While the above represents the preferred embodiment of the present invention, it will be apparent to those skilled in the art that various changes and modifications may be made herein without departing from the scope of the invention as claimed.

What is claimed is:

1. An apparatus for performing acoustic investigation of a subterranean formation having a wellbore therethrough, comprising:
   a transmitter configured to transmit acoustic signals;
   a receiver configured to receive acoustic signals; and
   an acoustic attenuation section disposed between said transmitter and said receiver and comprising one or more springs connected in series, each spring being disposed within a housing so that the housing limits the deflection of the spring under an axial load.

2. The apparatus of claim 1 wherein said springs are helical springs coated with a layer of resilient material.

3. The apparatus of claim 1 wherein said springs have a stiffness of at least 10,000 pounds per inch of deflection.

4. The apparatus of claim 1 wherein said springs have a stiffness of at less than 30,000 pounds per inch of deflection.

5. The apparatus of claim 1 wherein the coils of said springs have radial holes extending therethrough.

6. The apparatus of claim 1 wherein the outer surface of the ring is separated from the inner surface of the adjoining housing by at least 0.010 inches.

7. The apparatus of claim 1 wherein the outer surface of the ring is separated from the inner surface of the adjoining housing by less than 0.100 inches.

8. The apparatus of claim 1 wherein the outer surface of the housing is covered with an attenuating material.

9. The apparatus of claim 1 further comprising one or more rod members adapted to interconnect between two springs.

10. The apparatus of claim 1 wherein said attenuation section is capable of axial loads of 100,000 pounds.

11. The apparatus of claim 1 wherein said attenuation section is filled with fluid.

12. An apparatus for performing acoustic investigation of a subterranean formation having a wellbore therethrough, comprising:
a transmitter configured to transmit acoustic signals;
a receiver configured to receive acoustic signals; and
an acoustic attenuation section disposed between said transmitter and said receiver and comprising one or more springs connected in series, each spring being disposed within a housing so that the housing limits the deflection of the spring under an axial load, wherein said acoustic attenuation section further comprises a plurality of nodal masses disposed along said attenuation section.

13. The apparatus of claim 12 wherein said nodal masses aid in attenuation of low frequency signals and resist compression loads on the attenuation section.

14. An apparatus for performing acoustic investigation of a subterranean formation having a wellbore therethrough, comprising:
a transmitter configured to transmit acoustic signals;
a receiver configured to receive acoustic signals;
an acoustic attenuation section disposed between said transmitter and said receiver and comprising one or more springs connected in series, each spring being disposed within a housing so that the housing limits the deflection of the spring under axial load, and wherein said acoustic attenuation section further comprises a plurality of nodal masses disposed along said attenuation section; and
one or more rod members adapted to interconnect between two springs, wherein said nodal masses are disposed about said rod members.

15. The apparatus of claim 14 further including a layer of resilient material disposed between at least one of said rod members and at least one of said nodal masses.

16. An apparatus for attenuation of an acoustic signal comprising;
a plurality of springs connected in series to form an elongated body;
a plurality of housings corresponding in number to and disposed about said springs;
wherein said housing limits the axial deflection of said springs; and
a plurality of nodal masses corresponding in number to said springs and disposed along the length of the body.

17. The apparatus of claim 16 further comprising a plurality of rod members, wherein each rod member is axially interconnected between two of said plurality of springs.

18. An apparatus for attenuation of an acoustic signal comprising;
a plurality of springs connected in series to form an elongated body;
a plurality of housings corresponding in number to and disposed about said springs;
wherein said housing limits the axial deflection of said springs; and
a plurality of masses and a plurality of rod members, wherein said rod members are axially disposed between and connected to adjacent springs and said masses are positioned about said rod members.

19. The apparatus of claim 18 wherein said masses are separated from said rod members by a layer of attenuating material.

20. The apparatus of claim 18 wherein said springs are coated with a layer of resilient material.

21. The apparatus of claim 18 wherein a circumferential gap of between 0.010 and 0.100 inches is maintained between the outside surface of said spring and the inside surface of said housing.

22. The apparatus of claim 18 wherein the outside surface of said housings are coated with an attenuating material.

23. An apparatus for attenuation of an acoustic signal comprising;
a plurality of springs connected in series to form an elongated body; and
a plurality of housings corresponding in number to and disposed about said springs;
wherein said housing limits the axial deflection of said springs, wherein said springs are helical springs with a minimum stiffness of 10,000 lbs/in.

24. A method for attenuating acoustic energy transmitted along an acoustic tool, wherein the acoustic tool comprises a transmitter section, a receiver section, and an attenuation section disposed between the transmitter and receiver sections, comprising:
transmitting acoustic energy from the transmitter section into the attenuation section;
transmitting acoustic energy through the attenuation section to produce an attenuated acoustic energy, wherein the attenuation section comprises a one or more springs connected in series, a corresponding number of housings disposed about the springs, and a corresponding number of nodal masses; and
receiving the attenuated acoustic energy at the receiver.

25. A method for transmitting acoustic energy along an acoustic tool, wherein the acoustic tool comprises a transmitter section, a receiver section, and an attenuation section disposed between the transmitter and receiver sections, comprising:
receiving acoustic energy from the transmitter with a first spring wherein the first spring is enclosed within a housing that prevents extension of the spring beyond a predetermined limit;
receiving acoustic energy from the first spring with a connecting rod; wherein the connecting rod possesses a nodal mass that prevents compression of the spring beyond a predetermined limit;
receiving acoustic energy from the connecting rod with a second ring; and
receiving acoustic energy with the receiver via the second spring, wherein the acoustic energy received via the second spring is attenuated relative to the acoustic energy received by the first spring for all frequencies greater than 500 Hz.

* * * * *

UNITED STATES PATENT AND TRADEMARK OFFICE
CERTIFICATE OF CORRECTION

PATENT NO. : 6,834,743 B2
DATED : December 28, 2004
INVENTOR(S) : Abbas Arian and Randall Jones It is certified that error appears in the above-identified patent and that said Letters Patent is hereby corrected as shown below:

<u>Title page</u>,
Item [73], Assignee, should read -- Halliburton Energy Services, Inc. --

Signed and Sealed this

Fifth Day of April, 2005

JON W. DUDAS
*Director of the United States Patent and Trademark Office*